E. MARTIN.
NUT LOCK.
APPLICATION FILED APR. 7, 1917.
1,285,764.
Patented Nov. 26, 1918.
3 SHEETS—SHEET 2.
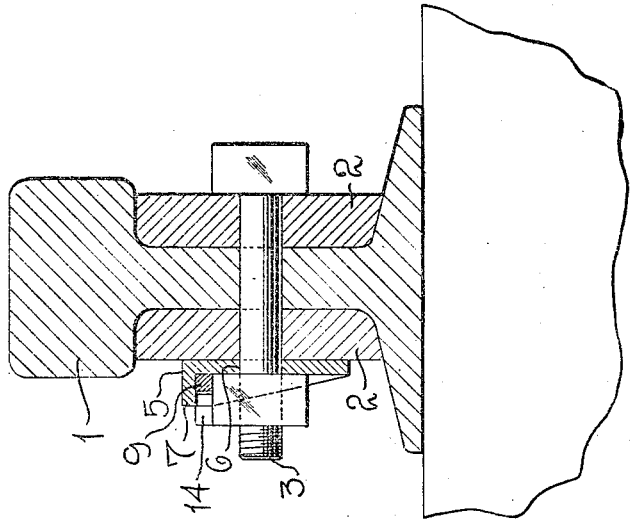
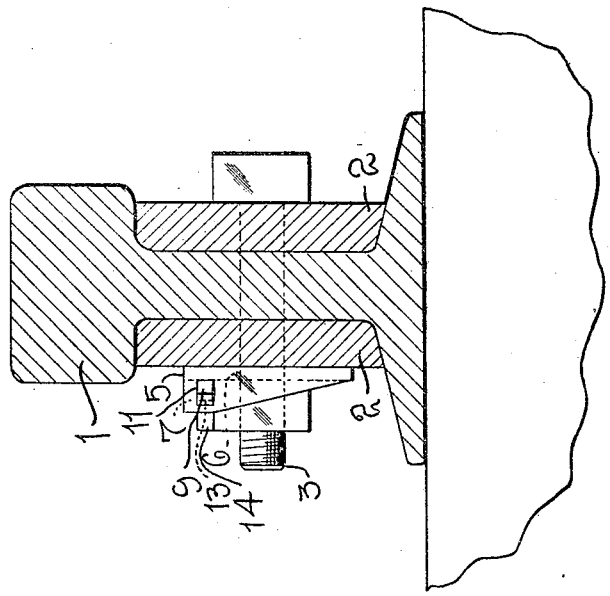
Inventor
ERNEST MARTIN E. MARTIN.
NUT LOCK.
APPLICATION FILED APR. 7, 1917.
1,285,764.
Patented Nov. 26, 1918.
3 SHEETS—SHEET 3.
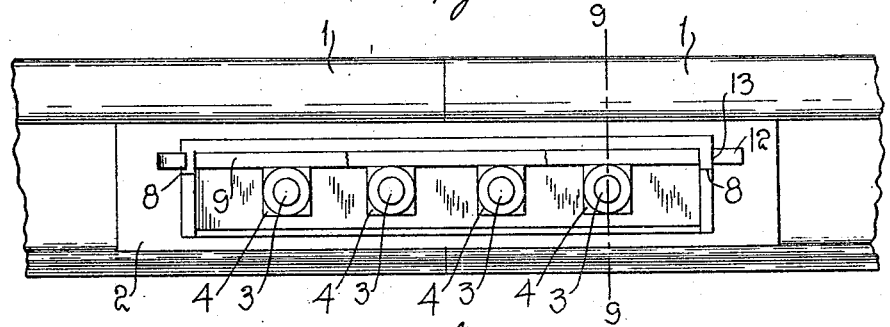
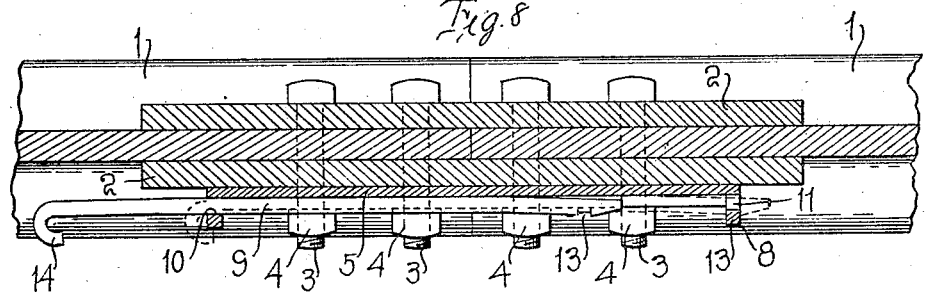
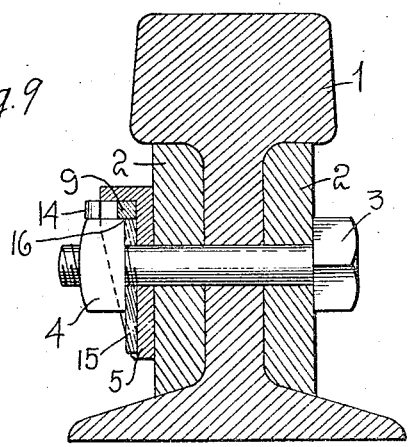
Inventor
ERNEST MARTIN
By John P. Duffie
Attorney

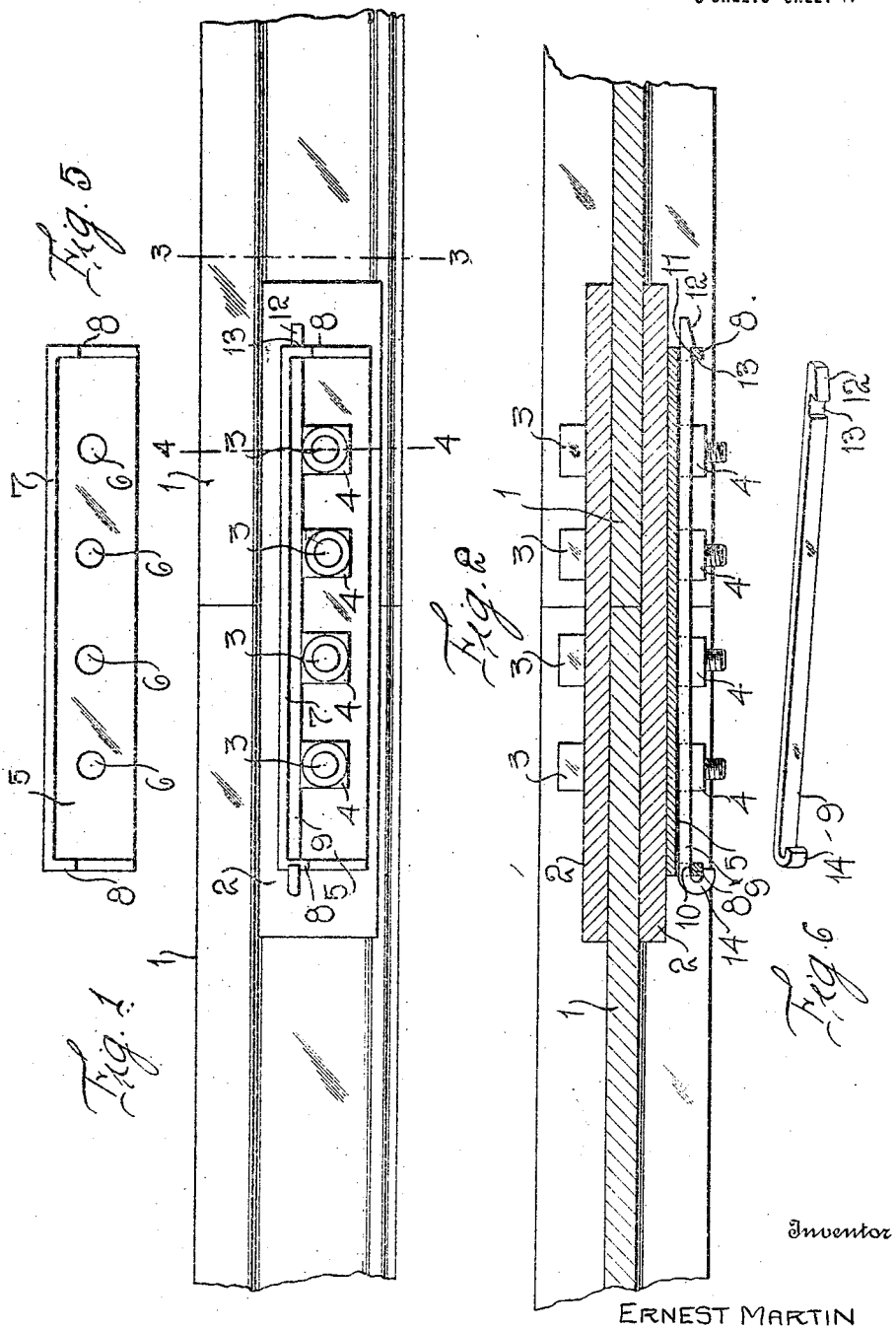

UNITED STATES PATENT OFFICE.

ERNEST MARTIN, OF NEOGA, ILLINOIS.

NUT-LOCK.

1,285,764.  Specification of Letters Patent.  Patented Nov. 26, 1918.

Application filed April 7, 1917. Serial No. 160,425.

*To all whom it may concern:*

Be it known that I, ERNEST MARTIN, a citizen of Belgium, residing at Neoga, in the county of Cumberland and State of Illinois, have invented certain new and useful Improvements in Nut-Locks, of which the following is a specification.

This invention relates to new and useful improvements in nut locks, and while primarily designed for the locking of nuts used at rail joints and on cars or vehicles subject to constant jar or vibration with the attendant liability of working loose, it may be used in any connection where found practical or advantageous.

The primary objects of my invention are to provide a nut lock which will be a labor saving device in that it may be easily and quickly applied, that will be economical in manufacture and efficient in operation and whereby an entire set or series of nuts may be locked with a single bar.

With the foregoing and other objects in view that will appear as the nature of the invention is better understood, the same consists in the novel features of construction, combination and arrangement of parts illustrated in the drawings and more particularly pointed out in the appended claim.

In the accompanying drawings:—

Figure 1 is a side elevation, illustrating the application of my nut lock to a rail joint.

Fig. 2 is a horizontal section, taken on the line 2—2 of Fig. 1.

Fig. 3 is a vertical transverse section, taken on line 3—3 of Fig. 1.

Fig. 4 is a similar view, taken on line 4—4 of Fig. 1.

Fig. 5 is a side elevation of the bolt receiving plate.

Fig. 6 is a detail perspective view of the nut locking bar.

Fig. 7 is a view similar to Fig. 1 of a slightly modified form of the invention.

Fig. 8 is a horizontal section of Fig. 8, and

Fig. 9 is a vertical transverse section taken on line 9—9 of Fig. 8.

Referring to the drawings for a more particular description of the invention and in which drawings like reference numerals designate like parts throughout the several views, 1 indicates the rails, 2 the fish plates, 3 the bolts and 4 the nuts of the ordinary rail joint.

My improved nut lock, as shown, comprises a flat metal bolt receiving plate 5 which is of elongated form and fits against the outer face of one of the fish plates of the rail joint, said plate being provided with a series of longitudinally spaced transverse openings 6 to receive the threaded ends of the bolts. Said plate is also provided at its upper edge with a horizontal outwardly projecting flange 7 and at opposite ends with the vertical outwardly extending flanges 8 which are disposed at right angles with the plane of the plate.

My invention further comprises a locking bar 9, of steel or other metal possessing the required resiliency which is adapted to be passed or inserted through corresponding alined transverse apertures 10 and 11 formed in the flanges 8 of the bolt receiving plate 5 near the upper ends thereof. This bar, when inserted in position fits between the horizontal flange 7 of the nut receiving plate 5 and the upper edges of the nuts, as shown. The outer end of the locking bar is beveled inwardly, as at 12, to facilitate the insertion thereof through the apertures 10 and 11 and is provided with a notch 13 adjacent said beveled end to receive the outer side wall of the aperture 11 whereby said bar is held in place. Said bar is also provided at its opposite end with an outwardly bent hook 14 adapted to hook over or engage the adjacent flange 8 of the nut receiving plate. This hook also assists in holding the nut locking bar in operative position.

Particular attention is called to the fact that said locking bar is curved slightly toward the center as a result of which the notched and hooked end portions of the bar will spring outwardly into engagement with the flanges 8 of the plate 6 when inserted in place while at the same time the bar will, for the greater portion of its length, fit or bear against the outer face of the former.

It will be observed that in inserting the nut locking bar in place the upper edges of the nuts will serve as a guide while it will be absolutely impossible for the nuts to work loose once this bar is in position. The tops or upper edges of the nuts also form a partial support for the locking bar.

In the modification illustrated in Figs. 7 to 9 inclusive, a second plate 15 is riveted to the outer face of the bolt receiving plate 5, the upper edge, as 16, of which, forms a shoulder or support upon which the locking bar 9 is slid from one opening in the bolt receiving plate 5 to the other. Said plate 15 extends the full length of the plate 5 and when used, the locking bar 9 rests partly on the upper edge thereof and partly on the tops of the nuts 4. As shown in Figs. 8 and 9, the plate 15 is of less thickness than that of the locking bar 9 as a result of which the latter extends beyond the outer face of the former and engages the tops of the nuts.

My invention is a labor saving device in that it may be quickly applied. It is also very economical in construction and effective in operation. Another advantage to be had through the use of my invention is that a whole series of nuts may be locked against working loose with the use of a single locking bar. To remove the locking bar, it is only necessary to spring the notched end thereof in out of engagement with the outer side wall of the aperture formed in the adjacent flange 8 of the nut receiving plate and withdraw the bar.

From the foregoing description taken in connection with the drawings it is thought that the construction, operation and advantages of my invention will be readily understood without requiring a more extended explanation.

Having described my invention, what I claim as new and desire to secure by Letters Patent, is:—

A nut lock comprising a flat metal plate having transverse apertures to receive the threaded ends of the bolts, a horizontal outwardly projecting flange at its upper edge and vertical outwardly projecting flanges at its ends formed with transverse alined apertures, a nut locking bar adapted to be inserted through said apertures and fitting between the horizontal flange of the nut receiving plate and the tops of the nuts, said locking bar provided at one end with a beveled notched portion adapted to engage the outer wall of the apertured portion of the adjacent vertical flange of said plate and formed at its opposite end with a hook adapted to hook over or engage the apertured portion of the vertical flange at the opposite end of the plate, the locking bar being gradually and slightly curved inward toward the center for the purpose specified.

In testimony whereof I affix my signature in the presence of two witnesses.

ERNEST MARTIN.

Witnesses:
THOMAS DIGENBAUM,
HARRY I. HANNAH.

Copies of this patent may be obtained for five cents each, by addressing the "Commissioner of Patents, Washington, D. C."